United States Patent
Schockaert et al.

(10) Patent No.: US 11,215,700 B2
(45) Date of Patent: Jan. 4, 2022

(54) METHOD AND SYSTEM FOR REAL-TIME MOTION ARTIFACT HANDLING AND NOISE REMOVAL FOR TOF SENSOR IMAGES

(71) Applicant: IEE International Electronics & Engineering S.A., Echternach (LU)

(72) Inventors: Cedric Schockaert, Waldbillig (LU); Frederic Garcia Becerro, Belvaux (LU); Bruno Mirbach, Konz (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 1133 days.

(21) Appl. No.: 15/563,329

(22) PCT Filed: Mar. 29, 2016

(86) PCT No.: PCT/EP2016/056788
§ 371 (c)(1),
(2) Date: Sep. 29, 2017

(87) PCT Pub. No.: WO2016/156308
PCT Pub. Date: Oct. 6, 2016

(65) Prior Publication Data
US 2018/0067197 A1 Mar. 8, 2018

(30) Foreign Application Priority Data
Apr. 1, 2015 (LU) .......................................... 92 688

(51) Int. Cl.
*G01S 7/48* (2006.01)
*G01S 7/4865* (2020.01)
(Continued)

(52) U.S. Cl.
CPC ............ *G01S 7/4866* (2013.01); *G01S 7/493* (2013.01); *G01S 17/36* (2013.01); *G01S 17/894* (2020.01);
(Continued)

(58) Field of Classification Search
CPC ..................................................... H04N 5/357
See application file for complete search history.

(56) References Cited

U.S. PATENT DOCUMENTS 10,455,219 B2 * 10/2019 Cohen ................. H04N 13/271
2012/0105585 A1 * 5/2012 Masalkar ............. H04N 13/271
348/46
(Continued)

FOREIGN PATENT DOCUMENTS

CN 102622745 A 8/2012
CN 104025567 A 9/2014
(Continued)

OTHER PUBLICATIONS

Lange et al., "Solid-State Time-of-Flight Range Camera", IEE Journal of Quantum Electronics, vol. 37, No. 3, Mar. 2001, pp. 390-397.
(Continued)

*Primary Examiner* — Hovhannes Baghdasaryan
(74) *Attorney, Agent, or Firm* — Reising Ethington P.C.

(57) ABSTRACT

A method and system for real-time motion artifact handling and noise removal for time-of-flight (ToF) sensor images. The method includes: calculating values of a cross correlation function $c(\tau)$ at a plurality of temporally spaced positions or phases from sent ($s(t)$) and received ($r(t)$) signals, thereby deriving a plurality of respective cross correlation values [$c(\tau_0)$, $c(\tau_1)$, $c(\tau_2)$, $c(\tau_3)$]; deriving, from the plurality of cross correlation values [$c(\tau_0)$, $c(\tau_1)$, $c(\tau_2)$, $c(\tau_3)$], a depth map D having values representing, for each pixel, distance
(Continued)

to a portion of an object upon which the sent signals (s(t)) are incident; deriving, from the plurality of cross correlation values $[c(\tau_0), c(\tau_1), c(\tau_2), c(\tau_3)]$, a guidance image (I; I'); and generating an output image D' based on the depth map D and the guidance image (I; I'), the output image D' comprising an edge-preserving and smoothed version of depth map D, the edge-preserving being from guidance image (I; I').

26 Claims, 3 Drawing Sheets

(51) Int. Cl.
*G01S 17/36* (2006.01)
*G01S 7/493* (2006.01)
*G01S 17/894* (2020.01)
*G06T 5/00* (2006.01)

(52) U.S. Cl.
CPC ............. *G06T 5/002* (2013.01); *G06T 5/003* (2013.01); *G06T 2207/10028* (2013.01); *G06T 2207/20182* (2013.01); *G06T 2207/20192* (2013.01)

(56) References Cited

U.S. PATENT DOCUMENTS

| | | | |
|---|---|---|---|
| 2012/0134598 A1* | 5/2012 | Ovsiannikov | G01S 7/4876 382/217 |
| 2014/0285719 A1* | 9/2014 | Gong | H04N 5/208 348/606 |
| 2015/0016720 A1* | 1/2015 | Vermeir | G06T 7/90 382/166 |
| 2015/0235351 A1* | 8/2015 | Mirbach | G06T 5/002 382/154 |
| 2015/0334318 A1* | 11/2015 | Georgiev | H04N 5/2256 348/46 |
| 2016/0086318 A1* | 3/2016 | Hannuksela | G01S 17/36 348/43 |
| 2017/0316602 A1* | 11/2017 | Smirnov | G06T 15/205 |

FOREIGN PATENT DOCUMENTS

| | | |
|---|---|---|
| CN | 104395931 A | 3/2015 |
| WO | WO2008152095 A1 | 12/2008 |
| WO | 2014072926 A1 | 5/2014 |
| WO | WO2014102442 A1 | 7/2014 |
| WO | 2014177750 A1 | 11/2014 |

OTHER PUBLICATIONS

Lindner et al., "Compensation of Motion Artifacts for Time-of-Flight Cameras", in Lecture Notes in Computer Science, vol. 5742, 2009, pp. 16-27.

Hussmann et al., "Real-time motion suppression in TOF range images", in IEEE Instrumentation & Measurement Technology Conference Proceedings, 2010, pp. 697-701.

Schmidt, "Analysis, Modeling and Dynamic Optimization of 3D Time-of-Flight Imaging Systems", PhD Thesis, Natural Sciences and for Mathematics of the Ruperto-Carola University of Heidelberg, Germany, 2011, 158 pages.

Hoegg et al., "A. Real-Time Motion Artifact Compensation for PMD-ToF Images", Lecture Notes in Computer Science, 2013, pp. 273-288.

Lefloch et al., "Real-time motion artifacts compensation of ToF sensors data on GPU", in Proceedings of SPIE vol. 8738, 2013, 8 pages.

Lee, "Time-of-Flight Depth Camera Motion Blur Detection and Deblurring", Signal Processing Letters, IEEE, 21 (6), 2014, pp. 663-666.

International Search Report for International application No. PCT/EP2016/056788, dated Jun. 13, 2016, 4 pages.

Written Opinion for International application No. PCT/EP2016/056788, dated Jun. 13, 2016, 6 pages.

J. Cho et al., "Enhancement of Depth Maps With Alpha Channel Estimation for 3-D Video", IEEE Journal of Selected Topics in Signal Processing, vol. 6, No. 5, dated Sep. 30, 2012, pp. 483-494.

S. Lee et al., "Adaptive Switching Filter for Noise Removal in Highly Corrupted Depth Maps from Time-of-Flight Image Sensors", Electronic Imaging, dated Dec. 31, 2012, pp. 1-7.

K. He et al., "Guided Image Filtering", IEEE Transactions on Pattern Analysis and Machine Intelligence, vol. 35, No. 6, dated Jun. 30, 2013, pp. 1397-1409.

English Translation of Chinese Office Action from counterpart Chinese Application No. 201680019856.0, dated Dec. 25, 2020, 18 pages.

* cited by examiner

METHOD AND SYSTEM FOR REAL-TIME MOTION ARTIFACT HANDLING AND NOISE REMOVAL FOR TOF SENSOR IMAGES

TECHNICAL FIELD

The present invention relates to image processing, and more particularly to a method and system for real-time motion artifact handling and noise removal for Time-of-Flight (ToF) sensor images.

BACKGROUND ART

There are a range of fields and applications in which accurate distance calculation by means of a ToF sensor (e.g. camera) is required. Those scenes captured by the camera may be either static or dynamic, and in the latter case the images may be corrupted by motion artifacts occurring at moving object boundaries.

Typical applications involving accurate depth measurements are human-computer interaction, in which fast hand segmentation for gesture recognition is sought, and automotive related applications, where occupancy classification, head pose estimation and/or environment perception is to be performed. Other applications will be apparent to the skilled person.

ToF cameras based on demodulation lock-in pixels estimate depth from the phase-shift between emitted and received modulated near-infrared (NIR) signals, in which four sequential phase-shifted images are required, i.e., the "four-taps" technique.

The conventional ToF working principle assumes the scene to be motionless during this time interval. However and in practice, unreliable depth measurements arise along object boundaries in dynamic scenes, especially when fast movements are involved.

Several approaches have been already proposed to deal with the motion artefact downside of TOF cameras. They are mainly classified in two main categories: (1) pixel-based and (2) flow-calculation-based correction.

In Hussmann, S., Hermanski, A., & Edeler, T. (2010), "Real-time motion suppression in TOF range images", in IEEE Instrumentation & Measurement Technology Conference Proceedings, pp. 697-701, 2010, the authors introduced a method to compensate the linear motion of objects on a conveyor belt. The linear shift is measured and compensated on the four phase-shifted images before depth calculation. However, their approach is restricted to linear motion within the range of the camera field-of-view.

Schmidt, M. "Analysis Modeling and Dynamic Optimization of 3D Time-of-Flight Imaging Systems", PhD Thesis, Natural Sciences and for Mathematics of the Ruperto-Carola University of Heidelberg, Germany, 2011, proposed a method to detect and correct the motion per pixel by analysing the temporal relationship along a set of N times four phase-shifted images acquired in burst mode; N being the size of the set. The method is constrained by the ToF camera hardware specifications, which must provide the N times the four phase-shifted images set.

More recently, Lee, S. "Time-of-Flight Depth Camera Motion Blur Detection and Deblurring", Signal Processing Letters, IEEE, 21(6), 663-666, 2014, has proposed a new pixel-based correction. The author developed several metrics that permit correction of pairs of corrupted phase-shifted images. However, this method is only applicable to those ToF cameras for which the integration time is divided in two stages, i.e., phase-shifted image pairs are recorded simultaneously.

In Hoegg, T., Lefloch, D., & Kolb, "A Real-Time Motion Artifact Compensation for PMD-ToF Images", Lecture Notes in Computer Science, pp. 273-288, 2013, the authors compensate the linear motion per pixel using an estimated flow field generated from the four phase-shifted images. Similarly, in Lindner, M., & Kolb, A. "Compensation of Motion Artifacts for Time-of-Flight Cameras", in Lecture Notes in Computer Science, Vol. 5742, pp. 16-27, 2009, optical flow is also computed between consecutive phase-shifted images in order to compensate the motion before depth calculation. Consequently, the method requires three optical flow calculations which makes the method non practical for real-time application.

In Lefloch, D., Hoegg, T., Kolb, A.: "Real-time motion artifacts compensation of ToF sensors data on GPU", in Proceedings of SPIE Vol. 8738, 2013, the authors reduced the complexity of the previous method by replacing the third optical flow by a polynomial approximation. However, real-time performance remains an issue.

A problem with known methods is how to address the motion artefact due to moving objects in the scene, in particular how achieve robust detection of corrupted depth pixels due to motion artefact or saturation.

A further problem is how to achieve real-time performance, enabling for further processing, e.g., gesture recognition or head pose estimation.

A further problem with known methods is how to achieve noise removal whilst preserving edges.

A further problem is how to select a guidance image to reconstruct the boundaries of moving objects.

A further problem with known methods is how to achieve noise and texture removal from the guidance image.

Therefore, an effective real-time approach to address the motion artefact related to the ToF camera's working principle is needed.

It is an object of the present invention to provide a system and method that address at least some of the foregoing problems and provide improved techniques for real-time motion artifact handling and noise removal for ToF sensor images.

SUMMARY

According to one aspect of the invention there is provided a method for real-time motion artifact handling and noise removal for time-of-flight (ToF) sensor images, the ToF sensor images corresponding to received signals (r(t)) received by a ToF sensor following sending of modulated sent signals (s(t)), the method comprising: calculating values of a cross correlation function $c(\tau)$ at a plurality of temporally spaced positions or phases from the sent (s(t)) and received (r(t)) signals, thereby deriving a plurality of respective cross correlation values $[c(\tau_0), c(\tau_1), c(\tau_2), c(\tau_3)]$; deriving, from the plurality of cross correlation values $[c(\tau_0), c(\tau_1), c(\tau_2), c(\tau_3)]$, a depth map D, the depth map D having values representing, for each pixel, distance to a portion of an object upon which the sent signals (s(t)) are incident; deriving, from the plurality of cross correlation values $[c(\tau_0), c(\tau_1), c(\tau_2), c(\tau_3)]$, a guidance image (I; I'); and generating an output image D' based on the depth map D and the guidance image (I; I'). Preferably, the guidance image (I; I') is an image having well defined edges. Preferably, the output image D' comprises an edge-preserving and smoothed version of depth map D, the edge-preserving being from guidance image (I; I').

The method may comprise acquiring a plurality of phase shifted images in succession, each phase shifted image corresponding to a respective temporally spaced position or phase. The phase-shifted images may comprise amplitude images.

Each cross correlation value [$c(\tau_0)$, $c(\tau_1)$, $c(\tau_2)$, $c(\tau_3)$] may correspond to one of a plurality of phase-shifted image, and the guidance image (I; I') is generated from the phase-shifted images.

The step of deriving the guidance image comprises selecting as the guidance image a phase-shifted image from a plurality of previously-acquired phase-shifted images, based on one or more predetermined criteria. The predetermined criteria may comprise that the phase-shifted image (i) with maximum amplitude of the object degraded by motion artefact, (ii) with maximum object edge sharpness value, (iii) with the best edge contrast and/or image SNR, (iv) with the maximum average spatial amplitude or (v) that is non-corrupted, is selected as the guidance image.

The method may include using a guided filter (GF) to apply valid depth measurements to previously identified corrupted depth pixels due to motion artifacts.

The step of generating an output image D' may comprise determining the output image D' as:

$$D'_i = \bar{a}_i I_i + \bar{b}_i.$$

In one embodiment, generating an output image D' comprises: filtering the guidance image I to generate a de-noised guidance image I'; and generating an output image D' based on the depth map D and the de-noised guidance image I'. The step of filtering the guidance image I to generate a de-noised guidance image I' may comprise using a guided filter to perform said filtering.

The step of generating an output image D' may further comprise: generating a plausibility map P based on the plurality of cross correlation values [$c(\tau_0)$, $c(\tau_1)$, $c(\tau_2)$, $c(\tau_3)$], the plausibility map P comprising, for each pixel of the depth map D, a value indicative of whether the pixel is corrupted by motion or saturation; and generating the output image D' based on the depth map D and the plausibility map P, and on either the guidance image I or the de-noised guidance image I'. The step of generating the plausibility map P may comprise determining, for each pixel, a metric $p_i$ representing the deviation of the phase-shifted amplitudes from a sinusoidal model of the cross-correlation function. The metric $p_i$ may comprise:

$$p_i = |c(\tau_1) - c(\tau_0) - c(\tau_2) + c(\tau_3)|/(a+\alpha)$$

where $\alpha$ is a regularization parameter preventing high value of $p_i$ when the amplitude $\alpha$ is low. The plausibility map P may have values $P_i$, for each pixel i such that:

$$P_i = \begin{cases} 1 & \text{if metric } p_i > \delta \\ 0 & \text{otherwise} \end{cases}$$

where $\delta$ is a motion threshold value, above which motion is detected at pixel i. The motion threshold value $\delta$ may be determined by capturing by the ToF sensor of an empty or motionless scene.

In one embodiment, filtering the guidance image I to derive the de-noised guidance image I' comprises: applying an edge preserving de-noising filter to guidance image I, whereby edge information and noise reduction from the guidance image I is transferred to the output image D'.

In one embodiment, filtering the guidance image I comprises deriving de-noised guidance image I' using:

$$I'_i = \bar{a}_i I_i + \bar{b}_i,$$

where $$\bar{a}_i = \frac{1}{|w|} \sum_{k \in w_i} a_k, \text{ with } a_k = \frac{\sigma_k^2}{\sigma_k^2 + \varepsilon}$$

$$\bar{b}_i = \frac{1}{|w|} \sum_{k \in w_i} b_k, \text{ with } b_k = (1 - a_k) \cdot \bar{I}_k,$$

$\sigma_k^2$ is the variance of I in $w_k$,
$|w|$ is the number of pixels in $w_k$,
$\varepsilon$ is a regularization parameter penalizing large $a_k$, and $$\bar{I}_k = \frac{1}{|w|} \sum_{i \in w_k} I_i$$

is the mean of I in $w_k$.

In one embodiment, generating an output image D' comprises generating an output image D' according to:

$$D'_i = \bar{a}_i I'_i + \bar{b}_i.$$

where $$\bar{a}_i = \frac{1}{|w|} \sum_{k \in w_i} \frac{\frac{1}{|w_k|} \sum_{j \in w_k} I'_j D_j P_j - \bar{I}_k \bar{D}_k}{\sigma_k^2 + \varepsilon},$$

$$\bar{b}_i = \frac{1}{|w|} \sum_{k \in w_i} \bar{D}_k - a_k \bar{I}_k, \text{ and}$$

$$\bar{D}_k = \frac{1}{|w_k|} \sum$$

$D_i P_i$ is the mean of D in $w_k$ weighted by the map P,
$|w|$ is the constant number of pixels in the window $w_i$ centered at pixel i,
$|w_k| = \sum_{i \in w_k} P_i$ is the number of pixels in $w_k$ where the plausibility is 1, and $$\sigma_k^2 = \frac{1}{|w_k|} \sum_{i \in w_k} I'^2_i P_i - \bar{I}_k^2$$

where $$\bar{I}_k = \frac{1}{|w_k|} \sum_{i \in w_k} I'_i P_i.$$

The output image D' may comprise a version of depth map D alternatively or additionally from which motion artifacts and/or noise have been suppressed or removed.

The cross correlation function $c(\tau)$ may be calculated as:

$$c(\tau) = \int_{t=0}^{T} r(t) \cdot s(t+\tau)dt = h + \frac{a}{2}\cos(\omega\tau + \varphi),$$

where
  s(t) is the sent signal given by s(t)=1+cos(ωt),
  r(t) is the received signal given by r(t)=h+a. cos(ωt−φ)
  ω=2πf$_m$ is the angular modulation frequency,
  f$_m$ is the modulation frequency, and
  h is the background light plus the non-modulated part of the sent signal.

The cross correlation values [c(τ$_0$), c(τ$_1$), c(τ$_2$), c(τ$_3$)] may be determined from c(τ) as four samples (τ$_k$), k=0, . . . ,3, taken at four subsequent time intervals $$\tau_k = k \cdot \frac{T}{4} = k/4f_m$$

within a modulated period T. In one embodiment, distance measurements d for each pixel of the depth map D are obtained from $$d = \frac{L}{2\pi} \cdot \phi$$

where $$\phi = \operatorname{atan}\left(\frac{c(\tau_3) - c(\tau_1)}{c(\tau_0) - c(\tau_2)}\right),$$

c≅3.10$^8$ m/s, the speed of light,
L is the working range or non-ambiguity distance range of the ToF sensor, and $$L = \frac{c}{2f_m}.$$

The method may further comprise deriving an amplitude image A defined as A=[a$_{ij}$]$_{m \times n}$, where the a$_{ij}$ are determined from:

$$a = \tfrac{1}{2}\sqrt{(c(\tau_3)-c(\tau_1))^2 + (c(\tau_0)-c(\tau_2))^2},$$

where c(τ$_0$), c(τ$_1$), c(τ$_2$), c(τ$_3$) are the cross correlation values.

In one embodiment, four cross correlation values [c(τ$_0$), c(τ$_1$), c(τ$_2$), c(τ$_3$)] are calculated from the cross correlation function c(τ).

According to another aspect of the invention there is provided a programmable image processing system when suitably programmed for carrying out the method of any of the preceding claims, the system comprising circuitry for receiving or storing the received signals (r(t)) and sent signals (s(t)), and processing circuitry for performing the methods.

According to another aspect of the invention there is provided a system for real-time motion artifact handling and noise removal for time-of-flight (ToF) sensor images, the ToF sensor images corresponding to received signals (r(t)) received by a ToF sensor following sending of modulated sent signals (s(t)), the system comprising: circuitry for receiving or storing the received signals (r(t)) and sent signals (s(t)); processing circuitry, coupled to the circuitry for receiving or storing the received signals (r(t)) and sent signals (s(t)), the processing circuitry being operable for calculating values of a cross correlation function c(τ) at a plurality of temporally spaced positions or phases from the sent (s(t)) and received (r(t)) signals, thereby deriving a plurality of respective cross correlation values [c(τ$_0$), c(τ$_1$), c(τ$_2$), c(τ$_3$)]; deriving, from the plurality of cross correlation values [c(τ$_0$), c(τ$_1$), c(τ$_2$), c(τ$_3$)], a depth map D, the depth map D having values representing, for each pixel, distance to a portion of an object upon which the sent signals (s(t)) are incident; deriving, from the plurality of cross correlation values [c(τ$_0$), c(τ$_1$), c(τ$_2$), c(τ$_3$)], a guidance image(I; I'), the guidance image (I; I') being an image having well defined edges; and generating an output image D' based on the depth map D and the guidance image(I; I'), the output image D' comprising an edge-preserving and smoothed version of depth map D, the edge-preserving being from guidance image (I; I').

According to another aspect of the invention there is provided a recordable, rewritable or storable medium having recorded or stored thereon data defining or transformable into instructions for execution by processing circuitry and corresponding to at least the steps of any of claims 1 to 24 of the appended claims.

According to another aspect of the invention there is provided a server computer incorporating a communications device and a memory device and being adapted for transmission on demand or otherwise of data defining or transformable into instructions for execution by processing circuitry and corresponding to at least the steps of any of the appended claims.

In each of the above aspects and embodiments, the emitted/sent and received signals may comprise modulated near-infrared (NIR) signals.

In certain embodiments, a robust method to identify those pixels in the resulting depth map that are prominent such as to be unreliable is provided. Then, their values are replaced by the closest reliable ones using the guided filter (GF) and an accurate guidance image generated from the previously acquired sequential phase-shifted images.

As used in embodiments, the GF presents a better behavior near edges than alternative edge preserving filters such as the widely used bilateral filter (BF), with a major advantage of being a fast and non-approximate linear time algorithm.

The present invention satisfactorily addresses the motion artefact, even in extreme conditions.

In contrast to the abovementioned prior art motion artefact compensation methods, the techniques disclosed herein only require a non-corrupted phase-shifted image (considered to be the guidance image), regardless of the ToF camera architecture and the way the distance is calculated. In addition, a real-time performance is achieved without parallelized computation on a GPU.

An advantage of the invention, at least in embodiments, is in addressing the motion artifact from depth map in real time. The object shape is extracted from one of the 4 phase-shifted amplitudes selected according to a criteria taking into account, e.g., the image SNR and edges contrast. This phase-shifted amplitude is used as guidance image for an edge preserving de-noising filter in order to reconstruct the depth of the objects degraded by motion artifact. In the prior art, motion correction is either
  a. performed pixel per pixel, without taking into account spatial correlation of the depth map, and usually creating other artifact like noise increase when the depth is corrected, or b. corrected by spatial analysis using pixel correspondence method between the four phase-shifted amplitudes, but not compatible with real-time application (dense optical flow based methods).

A further advantage, at least in embodiments, is in edge preserving spatial de-noising of depth map. The guidance image is filtered by means of a dedicated edge preserving de-noising filter. The noise reduction of the guidance image is transferred to the depth map in the motion artifact suppression stage. In the prior art, spatial de-noising is applied to the depth map directly. A spatial de-noising of the depth map requires ideally the depth map to be cleaned from artifacts (motion artifact, flying pixel artifact, . . . ) before being de-noised by an edge preserving filter to avoid the risk of spatial artifact propagation. In the proposed method, the depth map is de-noised by transferring the reduction of noise from the selected processed phase-shifted amplitude image. Phase-shifted amplitudes do not suffer from artifact like the depth map does, and as a consequence, object edges are usually better defined (no flying pixels).

A further advantage, at least in embodiments, is in the selection of a guidance image to reconstruct the border of moving objects in the depth map. A guidance image is defined as one of the 4 phase-shifted amplitudes. From the 4 phase-shifted amplitude images, the best guidance image is selected using a quality criterion, or a combination of criteria, taking into account, at minimum, the edge contrast and image SNR.

A further advantage, at least in embodiments, is in the process of the guidance image to reduce noise and remove texture. This image requires a dedicated processing
a. to remove unwanted artifact that could be transferred to the corrected depth map, and
b. to reduce the noise while object boundaries are preserved.

A further advantage, at least in embodiments, is in the detection of pixels corrupted by motion or saturation. A metric is used to measure the plausibility of each pixel of the depth map to be corrupted by motion artifact or saturation.

A further advantage is that, at least in embodiments, the invention enables an increase the integration time, i.e., the time period to acquire the 4 phase-shifted images in order to increase depth accuracy. This in turn might induce to motion artefact that might be handled by the method.

A further advantage is that, at least in embodiments, the invention also applies to depth accuracy increasing methods based on time-filtering, i.e., methods that combine several depth maps in order to increase depth accuracy. Non-matched depth pixels between the combined depth maps (due to moving objects) result in depth motion artefact that can be also addressed by the use of embodiments of the invention.

BRIEF DESCRIPTION OF THE DRAWINGS

Preferred embodiments of the invention will now be described, by way of example, with reference to the accompanying drawings, in which.

DETAILED DESCRIPTION

As used herein, the "images" or "image signals" may be analog or digital, and may be subject to conventional analog or digital filtering.

Where references are made herein to steps, operations or manipulations involving "images", etc., these are implemented, where appropriate, by means of operations upon electronically processable representations (e.g. captured stills of video frame signals, bitstream video data, MPEG files or video streams, PC-video, or any other capturable or viewable image data format) of such "images".

Where references are made herein to steps, operations or manipulations involving "images", "image signals" or "image data", these may be implemented, where appropriate, by means of software controlled processor operations, hardware circuitry or any suitable combination of these.

While the present invention is suitably embodied in a computer system, it may be incorporated in an adaptor, an image processor, or any other equipment located between or incorporating an image source or image capture device and a display device (e.g. LCD, Plasma, projector, etc.), or in the display device itself. The computer system suitably comprises a processor coupled (where appropriate via DACs and ADCs, or other interfaces) to RAM, ROM, storage devices, image capture and/or image storage devices, display driver and display devices, data communication and other peripherals, as is well known to persons skilled in the art; therefore, these will not be illustrated or discussed further.

In the following, the ToF working principle is briefly discussed, to facilitate the understanding of the disclosed embodiments of the present invention.

Time of Flight Principle

Figure 1A:
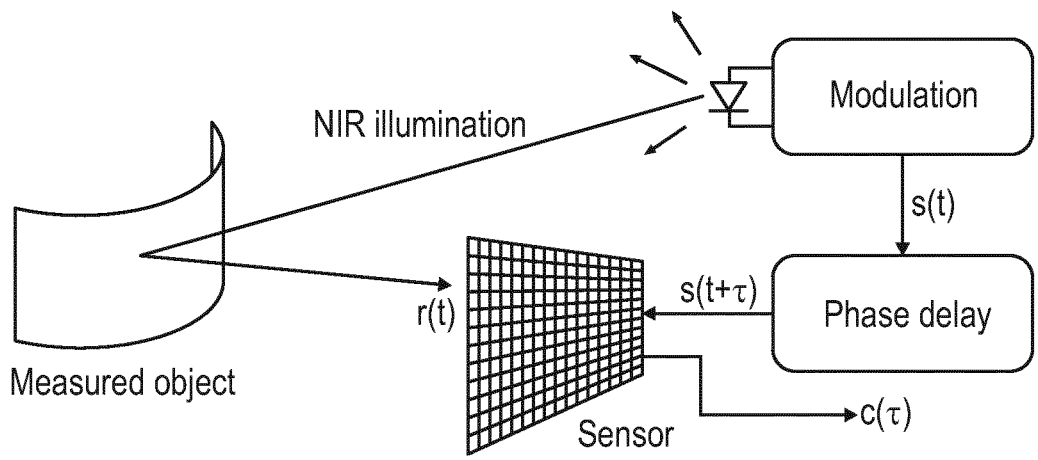
FIG. 1 (PRIOR ART) shows (a) a schematic diagram of object illumination and image capture, (b) plots of modulated signal strength for sent (s(t)) and received (r(t)) signals, and (c) sampling at four instants of the cross correlation c(τ) function calculated from the sent (s(t)) and received (r(t)) signals, according to the known working principle of ToF cameras.

FIG. 1(a) (PRIOR ART) shows a schematic diagram of object illumination and image capture, according to the known working principle of ToF cameras.

A ToF camera 102 includes a modulation element 104 generating a transmitted or sent signal s(t) that is emitted by optical emitter 106 as a modulated NIR illumination signal 108. The NIR illumination signal 108 is incident upon object 110 within a scene being sensed, with the reflected optical signal, reflected by object 110 being received at sensor (e.g. 2D CCD array) 112 as received signal r(t).

Also within ToF camera 102, a phase delay element 114 receives the sent signal s(t) and applies a phase delay to it, thus outputting a phased delayed signal s(t+τ), where τ is a phase delay. Processing circuitry (not shown) within or coupled to sensor 112 then calculates, based on phased delayed signal s(t+τ) and received signal r(t), cross correlation function c(τ), as discussed in further detail below.

As illustrated in FIG. 1(a), ToF cameras 102 based on demodulation lock-in pixels provide distance measurements from the difference in phase between sent (s(t)) and received (r(t)) modulated near-infrared (NIR) signals. The amplitude and phase of the incoming modulated received (r(t)) is retrieved by synchronously demodulating the received signal (r(t)) within the sensor/detector.

Figure 1B:
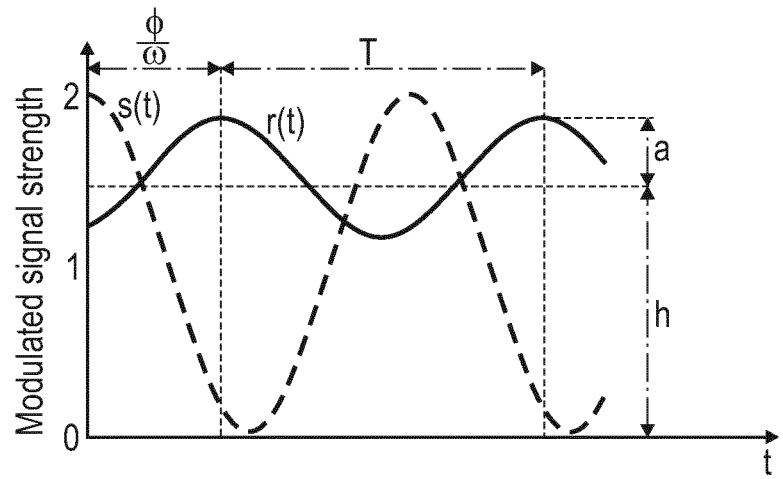

FIG. 1(b) (PRIOR ART) shows plots of modulated signal strength for sent (s(t)) and received (r(t)) signals, according to the known working principle of ToF cameras. Cross correlation between the received (modulated) signal r(t) of amplitude a and phase Φ, and the emitted modulated signal s(t), is performed. The phase Φ of the received signal (r(t)) can be determined by taking the measurement of the cross correlation function c(τ) at selectively chosen temporal positions or phases. The signals s(t) and r(t) are assumed to be sinusoidal, and may be expressed $$s(t)=1+\cos(\omega t)$$

$$r(t)=h+a. \cos(\omega t-\varphi)$$

with $\omega=2\pi f_m$ the angular modulation frequency, with $f_m$ the modulation frequency, and with h the background light plus the non-modulated part of the incident signal; the waveforms and their relationships are illustrated in FIG. 1(b).

The cross correlation function c(τ) is calculated as follows:

$$c(\tau) = \frac{1}{T}\int_{t=0}^{T} r(t) \cdot s(t+\tau)dt = h + \frac{a}{2}\cos(\omega\tau + \varphi).$$

Figure 1C:
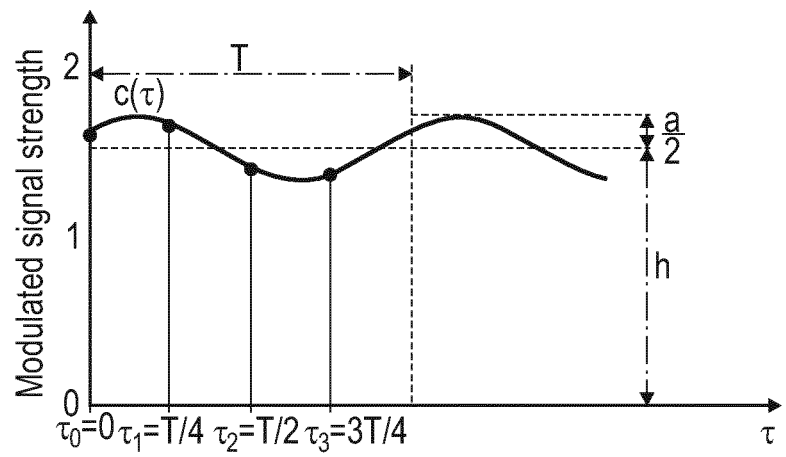

Three or more samples of c(τ) per modulated period T are usually needed in order to unambiguously determine the phase Φ and the amplitude a of the incident signal, as well as its offset h. In embodiments disclosed herein, the so-called four-taps technique is used, in which four samples ($\tau_k$), k=0, . . . , 3, are taken at intervals $$\tau_k = k \cdot \frac{T}{4} = k/4f_m$$

within a modulated period T. FIG. 1(c) (PRIOR ART) shows sampling at four instants of the cross correlation c(τ) function calculated from the sent (s(t)) and received (r(t)) signals. As a result, $$\phi = \mathrm{atan}\left(\frac{c(\tau_3) - c(\tau_1)}{c(\tau_0) - c(\tau_2)}\right)$$

$$a = 1/2\sqrt{(c(\tau_3) - c(\tau_1))^2 + (c(\tau_0) - c(\tau_2))^2}$$

$$h = \frac{c(\tau_0) + c(\tau_1) + c(\tau_2) + c(\tau_3)}{4}$$

In embodiments disclosed herein, four samples instead of three are chosen, to (i) improve robustness against noise, (ii) enable a highly symmetric design of the sensor, (iii) ensure that the phase is insensitive to quadratic non-linearities in detection, and (iv) simplify the formulae for the phase Φ, the amplitude a, and the offset h.

The working principle of ToF cameras 102 based on modulated NIR light resolves distance calculation from four phase-shifted images. Ideally, the four phase-shifted images would be simultaneously acquired, but in practice the acquisition is done sequentially. This in turn can cause corrupted distance calculations in those regions of non-matching raw phase values due to motion, that is, along object boundaries and within inhomogeneous reflection surfaces, which are more prominent the faster the object moves, the closer the object is to the ToF camera 102, and the higher the scene is exposed (higher integration time). Therefore, a larger integration time may be set for static scenes or scenes with slow moving objects, which would increase the depth accuracy, whereas and despite the increase of noise, short integration times may be set for high dynamic scenes with fast moving objects in order to avoid motion artefacts.

The distance measurements d to the object 110 in FIG. 1(a) are obtained from $$d = \frac{L}{2\pi} \cdot \phi$$

with c≅3.10⁸ m/s the speed of light and L the working range or non-ambiguity distance range of the ToF camera 102:

$$L = \frac{c}{2f_m}.$$

The factor ½ is due to the fact that light travels twice the distance between the camera 102 and the sensed object 110.

The ToF camera 102 incorporates, as will be appreciated by persons skilled in the art, an image sensor 112 whose size corresponds to the camera resolution (m×n). Hence, each single pixel constituting the image sensor 112 is identified by the pixel position (i, j ), where i indicates the row and j indicates the column. Each pixel measures a distance $d_{ij}$ to the object 110 (or a respective discrete portion thereof). As a result, the ToF camera 102 provides a distance image or depth map D defined as D=$[d_{ij}]_{m\times n}$, the matrix of all the elements $d_{ij}$.

In the same way, an amplitude image A is defined as A=$[a_{ij}]_{m\times n}$.

Figure 2:
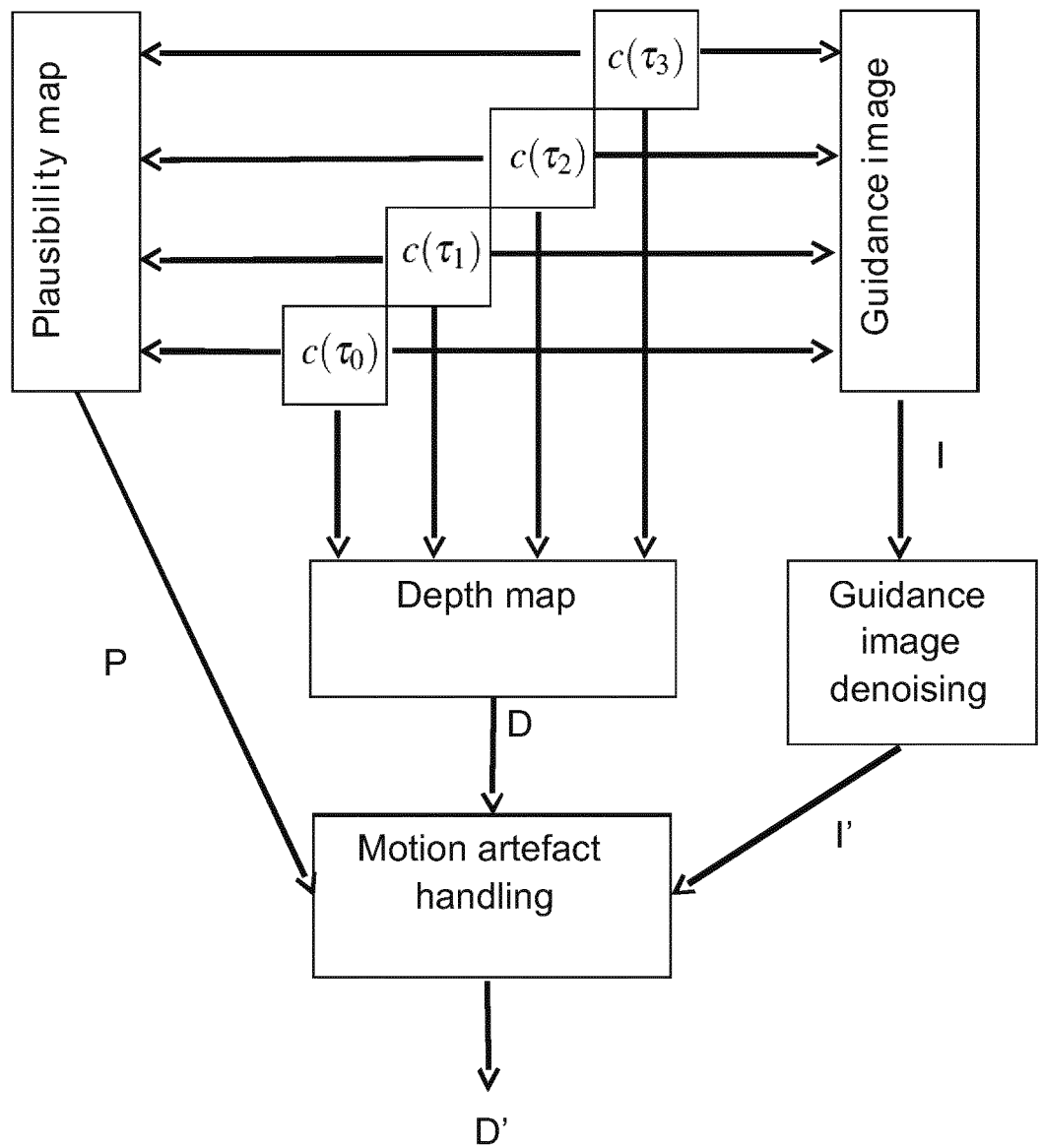
FIG. 2 schematically illustrates the architecture for processing signals, obtained as illustrated in FIG. 1, in accordance with an embodiment of the present invention.

FIG. 2 schematically illustrates the architecture or system 200 for processing signals, obtained as illustrated in FIG. 1, in accordance with an embodiment of the present invention. The processing may involve any of the signal generation, mathematical processing and signal and parameter representation as describes above in relation to FIG. 1, except where described otherwise in the following.

Briefly stated, from values [c($\tau_0$), c($\tau_1$), c($\tau_2$), c($\tau_3$)] of the correlation function c(τ), the depth map D is derived by depth map module 204, the depth map D comprising values representing, for each pixel thereof, a distance to an object upon which the sent signals are incident. Also based on the values [c($\tau_0$), c($\tau_1$), c($\tau_2$), c($\tau_3$)] of the correlation function c(τ), a guidance image I is generated by guidance image module 206, and, in a preferred embodiment, a de-noised guidance image I' is generated from guidance image I at guidance image de-noising module 208. (I in a preferred embodiment, however, the guidance image I may be used.) Finally, an output image (processed depth map) D' is generated and output by motion artifact handling module 210, based on depth map D and guidance image I or more preferably de-noised guidance image I'. In a further preferred embodiment, plausibility map generation module 212 generates a plausibility map P; and the output image (processed depth map) D' is generated and output by motion artifact handling module 210 based on (i) depth map D, (ii) plausibility map P and (iii) guidance image I or more preferably de-noised guidance image I'.

The processing by the various modules in FIG. 2 will be discussed in further detail below.

Guided Filter

In this section, the guided filter (GF), employed in at least some embodiments of the invention, is briefly discussed: this is used to (1) de-noise the guidance image in de-noising module 208, and (2) set valid depth measurements to the previously identified corrupted depth pixels due to motion artifact.

The GF, in a preferred embodiment, is a new edge-preserving smoothing filter that, compared to the widely used bilateral filter, presents a better behavior near edges with a major advantage of being a fast and non-approximate linear time algorithm (O(N) time), regardless of the kernel size and the intensity range.

Given a depth map D and a guidance image I, the resulting edge-preserving from I and smoothed version of D, i.e. D' is expressed as:

$$D'_i = \overline{a}_I I_i + \overline{b}_I.$$

where $$\overline{a}_I = \frac{1}{|w|} \sum_{k \in w_i} a_k, \text{ with } a_k = \frac{\frac{1}{|w|} \sum_{i \in w_k} I_i D_i - \overline{I}_k \overline{D}_k}{\sigma_k^2 + \varepsilon}$$

$$\overline{b}_I = \frac{1}{|w|} \sum_{k \in w_i} b_k, \text{ with } b_k = \overline{D}_k - a_k \overline{I}_k,$$

are linear coefficients assumed to be constant in $w_k$. $\overline{I}_k$ and $\sigma_k^2$ are respectively the mean and the variance of I in $w_k$, |w| is the number of pixels in $w_k$ and $\varepsilon$ is a regularization parameter penalizing large $a_k$.

$$\overline{D}_k = \frac{1}{|w|} \sum_{i \in w_k} D_i$$

is the mean of D in $w_k$.

The selection of the window size $w_k$ may be done according to application: it may be small for image detail enhancement in order to enhance thin details, and larger for structure transferring filtering. The smoothing level is given by the $\varepsilon$ parameter.

Plausibility Map

Each pixel of the four phase-shifted images acquired for distance calculation are samples [$c(\tau_0)$, $c(\tau_1)$, $c(\tau_2)$, $c(\tau_3)$] of the cross correlation function $c(\tau)$ between the emitted s(t) and received r(t) sinusoidally modulated signal, as illustrated in FIG. 1. Hence, if motion occurs during that acquisition time period, the temporal dependency of the cross correlation function $c(\tau)$ will invalidate its assumed sinusoidal nature. Indeed, each sample will be located on a different sinusoidal curve, cancelling the correlation between samples.

According to an embodiment, a pixel i affected by motion is identified by the following metric $$p_i = |c(\tau_1) - c(\tau_0) - c(\tau_2) + c(\tau_3)|/(a+\alpha)$$

where $\alpha$ is a regularization parameter preventing high value of $p_i$ when the amplitude a is low.

In this embodiment, a motion is detected at pixel i if its plausibility is larger than a threshold $\delta$:

$$P_i = \begin{cases} 1 & \text{if } p_i > \delta \\ 0 & \text{otherwise} \end{cases}$$

with $\delta$ a motion threshold value. The value of motion threshold value $\delta$ may be easily derived or adjusted by recording an empty or motionless scene by the ToF camera 102.

Guidance Image Selection and Processing

A guidance image I with well-defined and sharp edges is needed to adjust the object boundaries in D affected by the motion artefact. Selection of the guidance image is performed in guidance image module 206 in FIG. 2.

If it is assumed herein that the motion during each phase-shifted image $c(\tau_i)$ acquisition is negligible, any of the four phase-shifted images could be considered as a guidance image. However, as each phase-shifted image corresponds to a sampling of the cross correlation function $c(\tau)$ between the received (r(t)) and emitted (s(t)) modulated signals, the phase-shifted image having the maximum intensity will have the best SNR and thus, the best contrast at object boundaries. Therefore, in an embodiment, the phase-shifted image having the maximum average spatial amplitude is then selected as a guidance image I. A further step is preferably done in order to avoid transferring the noise from I to the filtered D. That is, the guidance image I is filtered using a GF with both guidance image and image to be filtered being the same, i.e.

$$I'_i = \overline{a}_I I_i + \overline{b}_I,$$

where $$\overline{a}_I = \frac{1}{|w|} \sum_{k \in w_i} a_k, \text{ with } a_k = \frac{\sigma_k^2}{\sigma_k^2 + \varepsilon}$$

$$\overline{b}_I = \frac{1}{|w|} \sum_{k \in w_i} b_k, \text{ with } b_k = (1 - a_k).\overline{I}_k,$$

$\sigma_k^2$ is the variance of I in $w_k$, |w| is the number of pixels in $w_k$, $\varepsilon$ is a regularization parameter penalizing large $a_k$, and $$\overline{I}_k = \frac{1}{|w|} \sum_{i \in w_k} I_i$$

is the mean of I in $w_k$.

Figure 3A:
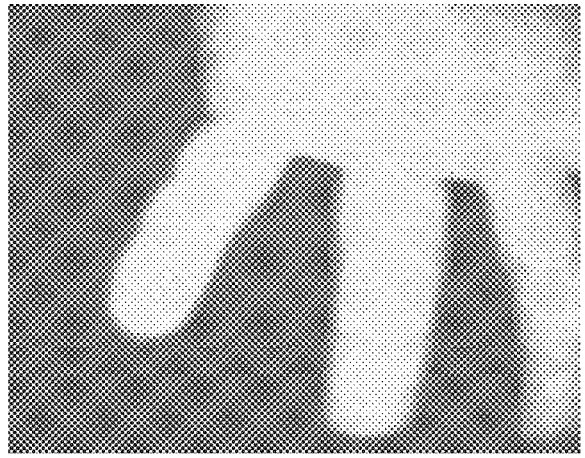
FIG. 3 shows (a) the raw guidance image I, and (b) the processed (de-noised) guidance image I', derived using the system of FIG. 2.
Figure 3A:
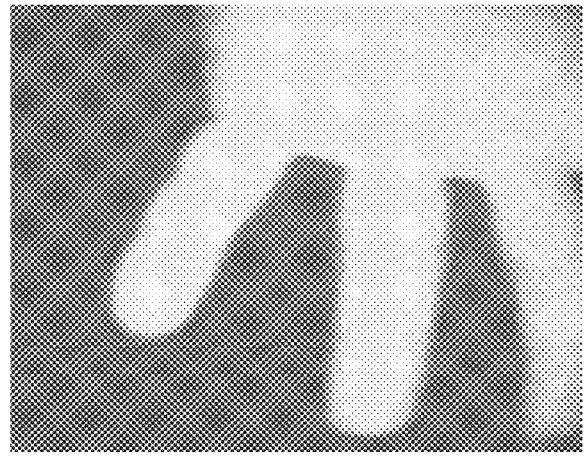

FIG. 3 shows (a) the raw guidance image I, and (b) the processed (de-noised) guidance image I', derived using the guidance image module 206 of the system of FIG. 2, for an example image.

Depth Motion Artifact Suppression Algorithm

Returning to FIG. 2, this shows the flow diagram of the method for motion artefact handling, in particular the use of motion artifact handling module 210, in an embodiment. With regard to processing at motion artifact handling module 210, a dedicated GF that integrates the plausibility map P, and using the guidance image I' is defined as follow:

$$D'_i = \overline{a}_I I'_i + \overline{b}_I,$$

where $$\overline{a}_I = \frac{1}{|w|} \sum_{k \in w_i} \frac{\frac{1}{|w_k|} \sum_{j \in w_k} I'_j D_j P_j - \overline{I}_k \overline{D}_k}{\sigma_k^2 + \varepsilon},$$

$$\overline{b}_l = \frac{1}{|w|} \sum_{k \in w_i} \overline{D}_k - a_k \overline{I}_k,$$

and $$\overline{D}_k = \frac{1}{|w_k|} \sum_{i \in w_k} D_i P_i$$

is the mean of D in $w_k$ weighted by the map P, |w| is the constant number of pixels in the window $w_i$ centered at pixel i, $|w_k| = \Sigma_{i \in w_k} P_i$ is the number of pixels in $w_k$ where the plausibility is 1, $$\sigma_k^2 = \frac{1}{|w_k|} \sum_{i \in w_k} I_i'^2 P_i - \overline{I}_k^2$$

where $$\overline{I}_k = \frac{1}{|w_k|} \sum_{i \in w_k} I_i' P_i.$$

Figure 4A:
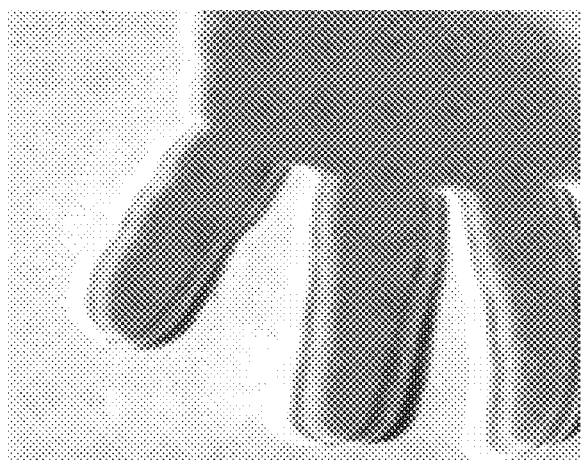
FIG. 4 shows (a) the input depth map D, and (b) the processed (resulting) depth map D', derived using the system of FIG. 2.
Figure 4B:
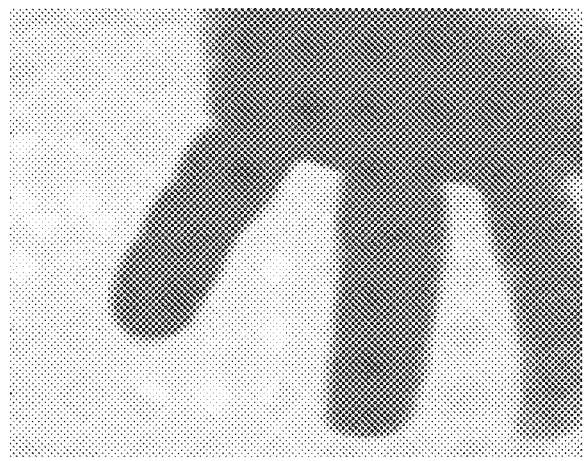

FIG. 4 shows (a) the input depth map D, and (b) the processed (resulting) depth map D', derived using the system of FIG. 2, for the example image of FIG. 3. An improvement in image quality (e.g. sharpness, edge definition, noise reduction) is apparent.

While embodiments have been described by reference to embodiments having various components in their respective implementations, it will be appreciated that other embodiments make use of other combinations and permutations of these and other components.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for real-time motion artifact handling and noise removal for time-of-flight (ToF) sensor images, the ToF sensor images corresponding to received signals (r(t)) received by a ToF sensor following sending of modulated sent signals (s(t)), the method comprising:
   calculating values of a cross correlation function $c(\tau)$ at a plurality of temporally spaced positions or phases from the sent (s(t)) and received (r(t)) signals, thereby deriving a plurality of respective cross correlation values $[c(\tau_0), c(\tau_1), c(\tau_2), c(\tau_3)]$, wherein each of the plurality of respective cross correlation values $[c(\tau_0), c(\tau_1), c(\tau_2), c(\tau_3)]$ corresponds to a respective one of a plurality of phase-shifted images;
   deriving, from the plurality of cross correlation values $[c(\tau_0), c(\tau_1), c(\tau_2), c(\tau_3)]$, a depth map D, the depth map D having values representing, for each pixel, distance to a portion of an object upon which the sent signals (s(t)) are incident;
   selecting, from the plurality of phase-shifted images, a guidance image (I; I'), the guidance image (I; I') being an image having well defined edges; and
   generating an output image D' based on the depth map D and the guidance image (I; I'), the output image D' comprising an edge-preserving and smoothed version of depth map D, the edge-preserving being from guidance image (I; I').

2. The method of claim 1, comprising acquiring the plurality of phase shifted images in succession, each phase shifted image corresponding to a respective temporally spaced position or phase.

3. The method of claim 1, wherein selecting the guidance image comprises selecting as the guidance image a phase-shifted image from a plurality of previously-acquired phase-shifted images, based on one or more predetermined criteria.

4. The method of claim 3, wherein the predetermined criteria comprise that the phase-shifted image (i) with maximum amplitude of the object degraded by motion artefact, (ii) with maximum object edge sharpness value, (iii) with the best edge contrast and/or image SNR, (iv) with the maximum average spatial amplitude or (v) that is non-corrupted, is selected as the guidance image.

5. The method of claim 1, including using a guided filter (GF) to apply valid depth measurements to previously identified corrupted depth pixels due to motion artifacts.

6. The method of claim 1, wherein generating an output image D' comprises determining the output image D' as:

$$D'_i = \overline{a}_l I_i + \overline{b}_l$$

where $$\overline{a}_l = \frac{1}{|w|} \sum_{k \in w_i} a_k, \text{ with } a_k = \frac{\frac{1}{|w|} \sum_{i \in w_k} I_i D_i - \overline{I}_k \overline{D}_k}{\sigma_k^2 + \varepsilon}$$

$$\overline{b}_l = \frac{1}{|w|} \sum_{k \in w_i} b_k, \text{ with } b_k = \overline{D}_k - a_k \overline{I}_k,$$

are linear coefficients assumed to be constant in $w_k$, $\overline{I}_k$ and $\sigma^2_k$ are respectively the mean and the variance of I in $w_k$, |w| is the number of pixels in $w_k$ and $\varepsilon$ is a regularization parameter penalizing large $$a_k \cdot \overline{D_k} = \frac{1}{|w|} \sum_{i \in w_k} D_i$$

is the mean of D in $w_k$.

7. The method of claim 1, wherein generating an output image D' comprises:
   filtering the guidance image I to generate a de-noised guidance image I'; and
   generating an output image D' based on the depth map D and the de-noised guidance image I'.

8. The method of claim 7, wherein filtering the guidance image I to generate a de-noised guidance image I' comprises using a guided filter to perform said filtering.

9. The method of claim 1, wherein generating an output image D' further comprises:
   generating a plausibility map P based on the plurality of cross correlation values $[c(\tau_0), c(\tau_1), c(\tau_2), c(\tau_3)]$, the plausibility map P comprising, for each pixel of the depth map D, a value indicative of whether the pixel is corrupted by motion or saturation; and
   generating the output image D' based on the depth map D and the plausibility map P, and on either the guidance image I or the de-noised guidance image I'.

10. The method of claim 9, wherein generating the plausibility map P comprises determining, for each pixel, a metric $p_i$ representing the deviation of the phase-shifted amplitudes from a sinusoidal model of the cross-correlation function.

11. The method of claim 10, wherein the metric $p_i$ comprises:

$$p_i = |c(\tau_1) - c(\tau_0) 31\ c(\tau_2) + c(\tau_3)| / (a + \alpha)$$

where $\alpha$ is a regularization parameter preventing high value of $p_i$ when the amplitude a is low.

12. The method of claim 10, wherein the plausibility map P has values $P_i$, for each pixel i such that:

$$P_i = \begin{cases} 1 & \text{if metric } p_i > \delta \\ 0 & \text{otherwise} \end{cases}$$

where $\delta$ is a motion threshold value, above which motion is detected at pixel i.

13. The method of claim 12, wherein $\delta$ is determined by capturing by the ToF sensor of an empty or motionless scene.

14. The method of claim 7, wherein filtering the guidance image I to derive the de-noised guidance image I' comprises:
   applying an edge preserving de-noising filter to guidance image I, whereby edge information and noise reduction from the guidance image I is transferred to the output image D'.

15. The method of claim 7, wherein filtering the guidance image I comprises deriving de-noised guidance image I' using:

$$I'_i = \overline{a}_i I_i + \overline{b}_i$$

where $$\overline{a}_i = \frac{1}{|w|} \sum_{k \in w_i} a_k, \text{ with } a_k = \frac{\sigma_k^2}{\sigma_k^2 + \varepsilon}$$

$$\overline{b}_i = \frac{1}{|w|} \sum_{k \in w_i} b_k, \text{ with } b_k = (1 - a_k) \cdot \overline{I}_k,$$

$\sigma_k^2$ is the variance of I in $w_k$,
|w| is the number of pixels in $w_k$,
$\varepsilon$ is a regularization parameter penalizing large $a_k$, and $$\overline{I}_k = \frac{1}{|w|} \sum_{i \in w_k} I_i$$

is the mean of I in $w_k$.

16. The method of claim 7, wherein generating an output image D' further comprises:
   generating a plausibility map P based on the plurality of cross correlation values $[c(\tau_0), c(\tau_1), c(\tau_2), c(\tau_3)]$, the plausibility map P comprising, for each pixel of the depth map D, a value indicative of whether the pixel is corrupted by motion or saturation; and
   generating the output image D' based on the depth map D and the plausibility map P, and on either the guidance image I or the de-noised guidance image I',
   wherein generating an output image D' comprises generating an output image D' according to:

$$D'_i = \overline{a}_i I'_i + \overline{b}_i.$$

where $$\overline{a}_i = \frac{1}{|w|} \sum_{k \in w_i} \frac{\frac{1}{|w_k|} \sum_{j \in w_k} I'_j D_j P_j - \overline{I}_k \overline{D}_k}{\sigma_k^2 + \varepsilon},$$

$$\overline{b}_i = \frac{1}{|w|} \sum_{k \in w_i} \overline{D}_k - a_k \overline{I}_k, \text{ and}$$

$$\overline{D}_k = \frac{1}{|w_k|} \sum_{i \in w_k} D_i P_i$$

is the mean of D in $w_k$ weighted by the map P,
|w| is the constant number of pixels in the window $w_i$ centered at pixel i,
$|w_k| = \Sigma_{i \in w_k} P_i$ is the number of pixels in $w_k$ where the plausibility is 1, and $$\sigma_k^2 = \frac{1}{|w_k|} \sum_{i \in w_k} I'^2_i P_i - \overline{I}_k^2$$

where $$\overline{I}_k = \frac{1}{|w_k|} \sum_{i \in w_k} I'_i P_i.$$

17. The method of claim 1, wherein the output image D' comprise a version of depth map D alternatively or additionally from which motion artifacts and/or noise have been suppressed or removed.

18. The method of claim 1, wherein the cross correlation function $c(\tau)$ is calculated as:

$$c(\tau) = \int_{t=0}^{T} r(t) \cdot s(t+\tau)dt = h + \frac{a}{2}\cos(\omega\tau + \varphi),$$

where
 $s(t)$ is the sent signal given by $s(t)=1+\cos(\omega t)$,
 $r(t)$ is the received signal given by $r(t)=h+a\cdot\cos(\omega t-\varphi)$
 $\omega=2\pi f_m$ is the angular modulation frequency,
 $f_m$ is the modulation frequency, and
 h is the background light plus the non-modulated part of the sent signal.

19. The method of claim 18, wherein the cross correlation values $[c(\tau_0), c(\tau_1), c(\tau_2), c(\tau_3)]$ are determined from $c(\tau)$ as four samples $(\tau_k)$, k=0, ..., 3, taken at four subsequent time intervals $$\tau_k = k \cdot \frac{T}{4} = k/4f_m$$

within a modulated period T.

20. The method of claim 10, wherein the distance measurements d for each pixel of the depth map D are obtained from $$d = \frac{L}{2\pi} \cdot \phi$$

where $$\phi = \operatorname{atan}\left(\frac{c(\tau_3) - c(\tau_1)}{c(\tau_0) - c(\tau_2)}\right),$$

$c \cong 3 \cdot 10^8$ m/s, the speed of light,
L is the working range or non-ambiguity distance range of the ToF sensor, and $$L = \frac{c}{2f_m}.$$

21. The method of claim 1, wherein an amplitude image A defined as $A=[a_{ij}]_{m\times n}$, where the $a_{ij}$ are determined from:

$$a = \tfrac{1}{2}\sqrt{(c(\tau_3)-c(\tau_1))^2 + (c(\tau_0)-c(\tau_2))^2},$$

where $c(\tau_0)$, $c(\tau_1)$, $c(\tau_2)$, $c(\tau_3)$ are the cross correlation values.

22. The method of claim 1, wherein four cross correlation values $[c(\tau_0), c(\tau_1), c(\tau_2), c(\tau_3)]$ are calculated from the cross correlation function $c(\tau)$.

23. A programmable image processing system when suitably programmed for carrying out the method of claim 1, the system comprising circuitry for receiving or storing the received signals (r(t)) and sent signals (s(t)), and processing circuitry for performing the methods.

24. A system for real-time motion artifact handling and noise removal for time-of-flight (ToF) sensor images, the ToF sensor images corresponding to received signals (r(t)) received by a ToF sensor following sending of modulated sent signals (s(t)), the system comprising:
 circuitry for receiving or storing the received signals (r(t)) and sent signals (s(t));
 processing circuitry, coupled to the circuitry for receiving or storing the received signals (r(t)) and sent signals (s(t)), the processing circuitry being operable for
  calculating values of a cross correlation function $c(\tau)$ at a plurality of temporally spaced positions or phases from the sent (s(t)) and received (r(t)) signals, thereby deriving a plurality of respective cross correlation values $[c(\tau_0), c(\tau_1), c(\tau_2), c(\tau_3)]$, wherein each of the plurality of respective cross correlation values $[c(\tau_0), c(\tau_1), c(\tau_2), c(\tau_3)]$ corresponds to a respective one of a plurality of phase-shifted images;
  deriving, from the plurality of cross correlation values $[c(\tau_0), c(\tau_1), c(\tau_2), c(\tau_3)]$, a depth map D, the depth map D having values representing, for each pixel, distance to a portion of an object upon which the sent signals (s(t)) are incident;
  selecting, from the plurality of phase-shifted images, a guidance image (I; I'), the guidance image (I; I') being an image having well defined edges; and
  generating an output image D' based on the depth map D and the guidance image (I; I'), the output image D' comprising an edge-preserving and smoothed version of depth map D, the edge-preserving being from guidance image (I; I').

25. A non-transitory recordable, rewritable or storable medium having recorded or stored thereon data defining or transformable into instructions for execution by processing circuitry and corresponding to at least the steps of claim 1.

26. A server computer incorporating a communications device and a memory device and being adapted for transmission on demand or otherwise of data defining or transformable into instructions for execution by processing circuitry and corresponding to at least the steps of claim 1.

* * * * *